R. ELWOOD & R. L. PITCHER.
Improvement in Cultivators.
No. 132,527.
Patented Oct. 29, 1872.
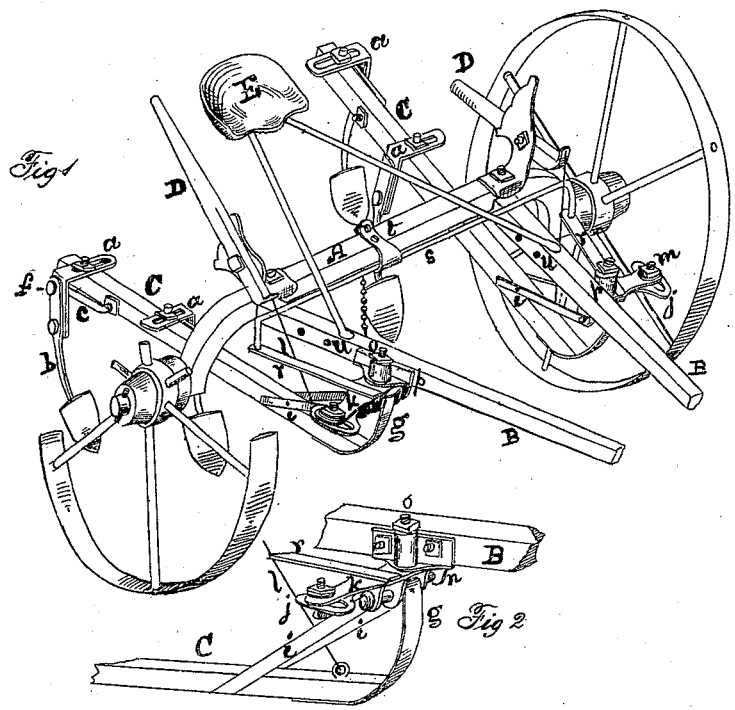
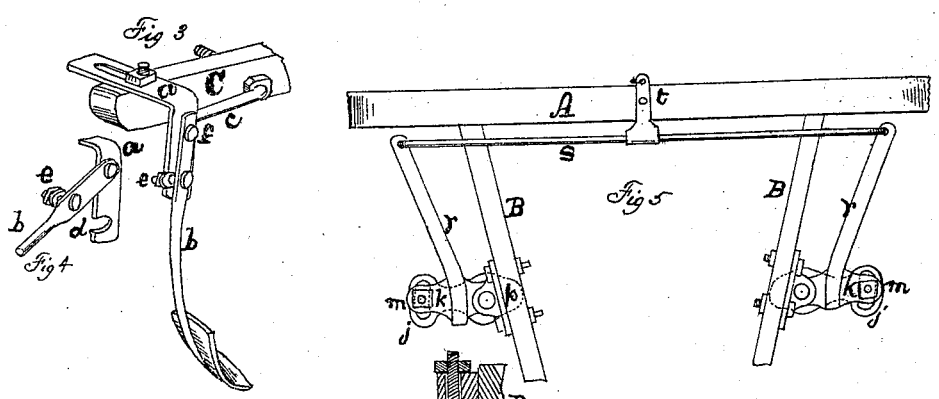
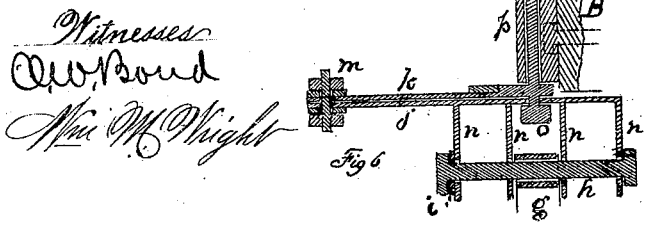

UNITED STATES PATENT OFFICE.

REUBEN ELWOOD AND RICHARD L. PITCHER, OF SYCAMORE, ILLINOIS.

IMPROVEMENT IN CULTIVATORS.

Specification forming part of Letters Patent No. 132,527, dated October 29, 1872.

*To all whom it may concern:*

Be it known that we, REUBEN ELWOOD and RICHARD L. PITCHER, of Sycamore, in the county of De Kalb and State of Illinois, have invented certain new and useful Improvements in Cultivators, of which the following is a full description, reference being had to the accompanying drawing making a part of this specification, in which—

Figure 1 is a perspective view with the tongue and one wheel partly broken off; Fig. 2, a detail, showing the mode of connecting the plow-beam to the frame; Fig. 3, a detail of the plow, showing the mode of connecting it with the beam; Fig. 4, a detail of the mode of throwing out the plows to prevent breakage; Fig. 5, a plan view of the parts used to connect the plow-beams; and Fig. 6, a vertical section of the parts shown in Fig. 2 enlarged.

The nature of our improvements consists in so connecting the plow-beams to the frame that the machine may be changed from a riding to a walking cultivator; in the mode of hanging or pivoting the front end of the beams; in the joint by which the front end of the beam is connected to the main or carrying-frame; in the mode of connecting the two beams so as to make them act in unison; in the method of making them rigid; in the mode of making the standard to which the plow is attached laterally adjustable; and in an improved mode of preventing breakage of the plows.

In the drawing, A represents an axle supported upon suitable wheels; B, tongue separated at the rear, so as to form the main frame; C, plow-beams; D, levers for raising the plows out of the ground; E, driver's seat; $a$, slotted bar, bent as shown at Fig. 3, to which the plow-standard is attached; $b$, plow-standard; $c$, adjustable brace; $d$, opening or notch in the bent bar $a$; $e$, friction-nut; $f$, bolt by which the plow-standard is pivoted to the bar $a$; $g$, bent bar at front end of the plow-beam; $h$, bolt by which it is pivoted; $i$, braces; $j$, arm extending outward at the connection of the beam with the main frame; $k$, arm extending out from the main frame over the arm $j$, and pivoted to the main frame; $l$, chain or rod connecting the lever D with the plow-beam C; $m$, bolt and nut for making the connection between $k$ and $j$ at the outer end rigid; $n$, frame to which the front end of the beam is attached with the braces $i$; $o$, pivotal bolt by which the frame $n$ is attached to the main frame; $p$, bearings for the pivotal bolt $o$, securely attached to the main frame B; $r$, sway bars or arms, permanently attached to the arms $k$ and extending back nearly to the axle; $s$, rod or bar for connecting the arms or bars $r$ together; $t$, arm or projection on the bar $s$ for securing said bar to the axle, so as to make the machine rigid; $u$, holes by which the bar $p$ can be moved back on the main frame, so that the machine may be changed to a walking-cultivator.

The axle A may be made of wood or iron, or partly of both, as desired. The frame B, plow-beams C, and levers D are made of wood, and the rest of the machine of iron; the frame $n$, arms $j$ $k$ $r$, and the bearings $p$ we usually make of cast-iron. The bent bars $a$ are provided with slots, as shown, and are attached to the beam by a bolt and nut, so that they may be moved in or out, as desired. The brace $c$ is provided with a screw-thread where it passes through the beam, and is adjusted by a nut on each side of the beam. The lower end of the bar $a$ is provided with a notch, $d$, as shown at Fig. 4. The standards $b$ are pivoted to the bars $a$ at $f$, and are provided with a bolt passing through the notch $d$, by which sufficient friction is applied to hold the plows in place when in operation, and is so adjusted that when either of the plows strikes against a stone or other obstruction the plow will swing back without being broken. The frame $n$ is divided into small compartments, as shown at Fig. 6, and the bar $g$ can be placed in either one of these compartments, or changed from one to the other, so that the beams C can be brought nearer together or be separated further apart. One or more braces are attached to the beams C and connect this frame $n$, as shown at Fig. 2; one brace will be sufficient, but we prefer two, as shown, as they afford greater security against the rocking or tipping of the beams C. By connecting them with the same bolt that connects the bar $g$, they do not interfere with the raising or lowering of the plow-beams. The frame $n$ is held in place by the pivotal bolt $o$, so that it has a free movement on said bolt and permits a lateral movement of the plow-beams; this movement is regulated by the arms $j$ $k$. The outer end of the arm $j$ is notched and provided with a slot, as shown, so that when the nut $m$ is loosened it has an independent movement, limited only by the slot. When the nut $m$ is screwed down, the arms $j$ and $k$ move together and are controlled in their movements by the arms $r$. These arms $r$ are connected by the bar $s$, so that when the nut $m$ is screwed down the two beams move together. By loosening the nuts $m$, or by lifting the rod $s$ without loosening the nuts $m$, each beam will have an independent lateral movement. When all the parts are locked as described, by inserting a pin in the holes shown in the arm $t$ and the axle, the whole machine is made rigid and all lateral movement of the beams prevented. Suitable handles, not shown, are attached to the beams C, so as to be in reach of the driver when used as a riding-machine, and to be grasped by the operator when used as a walking-machine.

To change the machine from a riding-cultivator, as shown at Fig. 1, the bearing $p$ is detached and moved back to the holes $u$, where they are again secured by suitable bolts. This is necessary to relieve the horses' necks of the down-draft, which is counterbalanced by the driver when they are placed forward and used as a riding-cultivator. By this arrangement the machine is properly balanced, whether the operator rides or walks, and the connection of the braces and the lifting-levers preserved without any changing of their parts.

We do not claim broadly the changing of a machine from a riding to a walking one by dropping the beams to the rear, as that is shown in patent No. 90,905.

A row of holes may be substituted for the slot in the arm $j$, and a pin for the friction-nut and bolt $m$. The completed machine and parts are of the usual sizes and dimensions.

What we claim as new is as follows—

1. The combination of the movable bearings $p$ with the bars B of the tongue or frame and the plow-beams C, so that the plows may be moved back and the machine changed to a walking-cultivator, substantially as described.

2. The pivoted frame $n$ in combination with the beam C, bar $g$, brace $i$, arranged to move on the bolt $h$ of such frame, substantially as and for the purpose specified.

3. The combination of the arm $j$, provided at its outer end with the arm $k$, arm $r$, friction-nut or clutch $m$, and beams C, substantially as specified.

4. The combination of the bar $s$ with the arms $r$ $k$ $j$ and beams C, substantially as specified.

5. The combination of the arms $k$, $j$, and $r$, rod $s$, arm $t$, and beam C, for making the machine rigid, substantially as described.

6. The combination and arrangement of the standard $b$ with the arm $a$, opening $d$, and friction-nut $e$, substantially as and for the purposes described.

REUBEN ELWOOD.

Witnesses:
RICHARD L. PITCHER.
JAMES F. BERRY,
GAINS B. WISEMAN.